United States Patent [19]

Gizaw

[11] Patent Number: 5,250,867
[45] Date of Patent: Oct. 5, 1993

[54] PERMANENT MAGNET BRUSHLESS DC MOTOR HAVING REDUCED COGGING

[75] Inventor: Daniel Gizaw, Indianapolis, Ind.

[73] Assignee: General Electric Company, Fort Wayne, Ind.

[21] Appl. No.: 796,041

[22] Filed: Nov. 20, 1991

[51] Int. Cl.$^5$ .................... H02K 21/12; H02K 1/14
[52] U.S. Cl. .................... 310/179; 310/156; 310/181; 310/216
[58] Field of Search ............ 310/106, 156, 187, 179, 310/181, 190, 192, 193, 216, 254, 261, 168

[56] References Cited

U.S. PATENT DOCUMENTS

| | | | |
|---|---|---|---|
| 830,262 | 9/1906 | Torda | 310/106 |
| 3,956,678 | 5/1976 | Byrne et al. | 318/138 |
| 4,112,319 | 9/1978 | Field | 310/49 R |
| 4,169,990 | 2/1979 | Lerdman | 318/138 |
| 4,209,720 | 6/1980 | Ducrot et al. | 310/45 |
| 4,234,808 | 11/1980 | Geppert et al. | 310/49 R |
| 4,280,072 | 7/1981 | Gotou et al. | 310/67 R |
| 4,496,887 | 1/1985 | Ichihara et al. | 318/254 |
| 4,499,407 | 2/1985 | McCleod | 318/254 |
| 4,516,048 | 5/1985 | Brigham | 310/254 |
| 4,583,015 | 4/1986 | Toshimitsu | 310/187 |
| 4,672,253 | 6/1987 | Tajima et al. | 310/269 |
| 4,874,975 | 10/1989 | Hertrich | 310/186 |
| 4,912,833 | 4/1990 | Fritzsche | 29/596 |
| 4,933,584 | 6/1990 | Harms et al. | 310/162 |

FOREIGN PATENT DOCUMENTS

| | | |
|---|---|---|
| 54-99910 | 8/1979 | Japan . |
| 55-71162 | 5/1980 | Japan . |
| 56-30775 | 7/1981 | Japan . |
| 58-42707 | 9/1983 | Japan . |
| 58-42708 | 9/1983 | Japan . |

OTHER PUBLICATIONS

Electro-Craft Corp., *Engineering Handbook*, "DC Motors Speed Controls Servo Systems", Fifth Edition 1980, Hopkins, Minn., Chapter 2; DC Motors and Generators, pp. 2.1-2.15, 2.29-2.33, 2.48-2.55, 2.66-2.70; Chapter 6: Brushless DC Motors, pp. 6.1-6.35.

Erdman, et al., "Electronically Commutated DC Motors for the Appliance Industry", *IEEE-IAS-1984 Annual Meeting*, Chicago, Ill., Sep. 4, 1984, pp. 1339-1345.

Krause et al., "Analysis of a Permanent Magnet Synchronous Machine Supplied from a 180° Inverter with Phase Control", *IEEE Transactions on Energy Conversion*, vol. EC-2, No. 3 pp. 423-431, Sep. 1987, USA.

Persson E. K., "Brushless Motor Technology", *Fourth Annual Motor-Con Conference*, Orlando, Fla., Apr. 1983, pp. 129-140.

Primary Examiner—Steven L. Stephan
Assistant Examiner—D. R. Haszko
Attorney, Agent, or Firm—Ralph E. Krisher, Jr.

[57] ABSTRACT

An improved salient pole configuration for a dynamoelectric machine is disclosed, particularly for a permanent magnet brushless DC motor wherein cogging torque is a problem. One or more apertures or "reluctance holes" are disposed within the head portion of the salient poles in the stator such that the reluctance holes are substantially adjacent but not adjoining the pole face, thereby forming a bridge between the aperture and the pole face. The reluctance hole bridge provides a substantially constant air gap flux density to reduce cogging, while at the same time, provides a low reluctance shunt path for the armature reaction flux around the permanent magnet to improve the demagnetization margin. The efficiency of the machine is also improved.

24 Claims, 5 Drawing Sheets

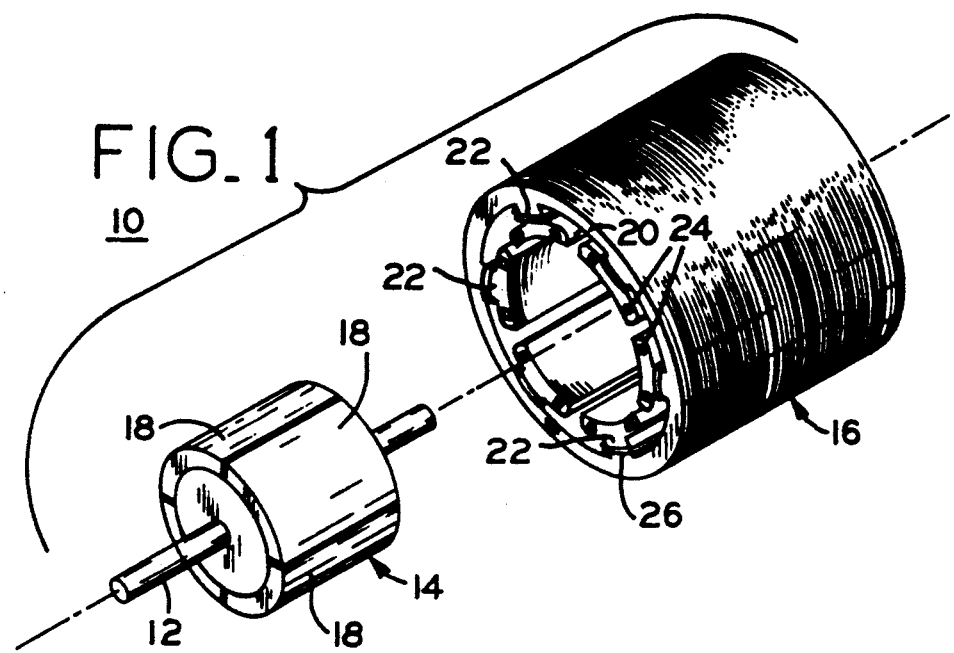
FIG_1
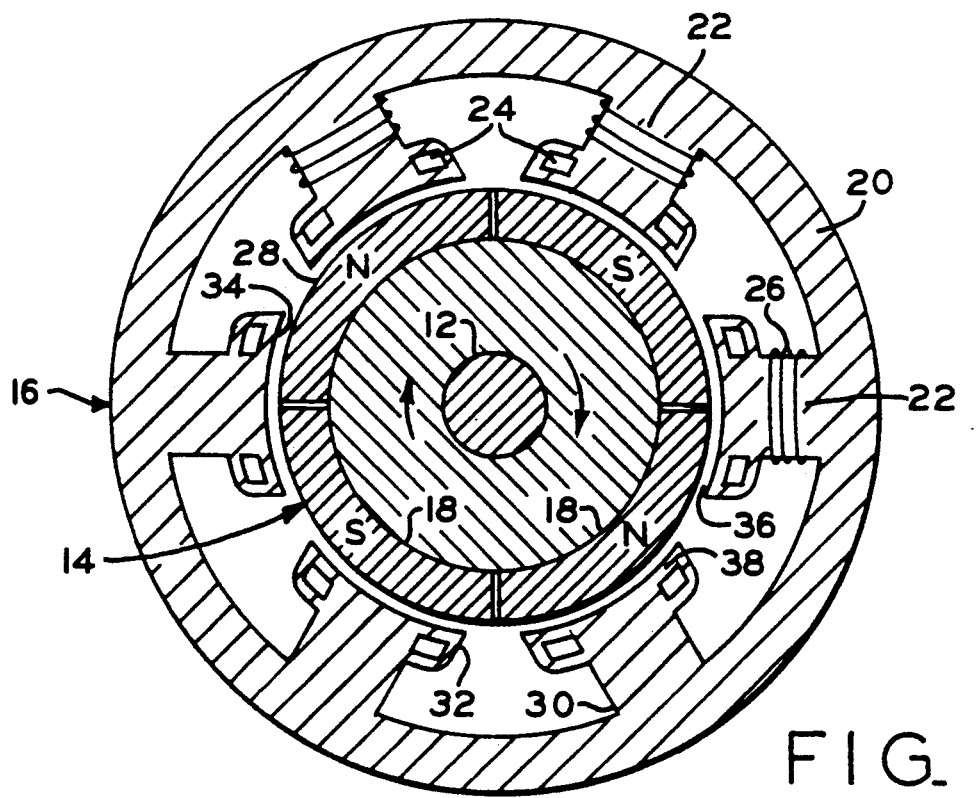
FIG_2

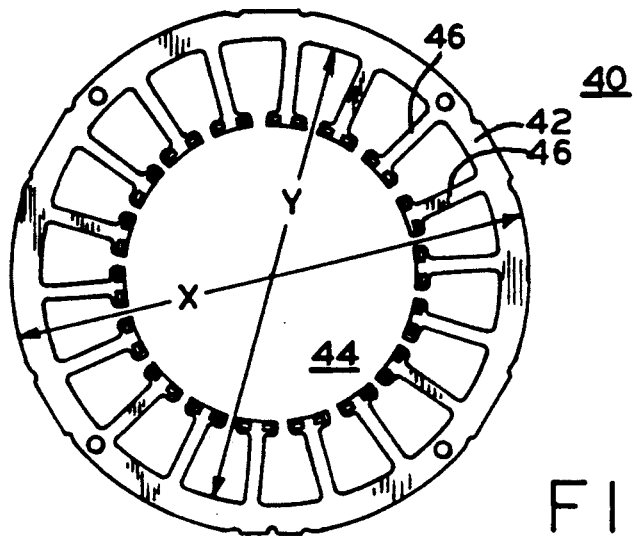
FIG_3
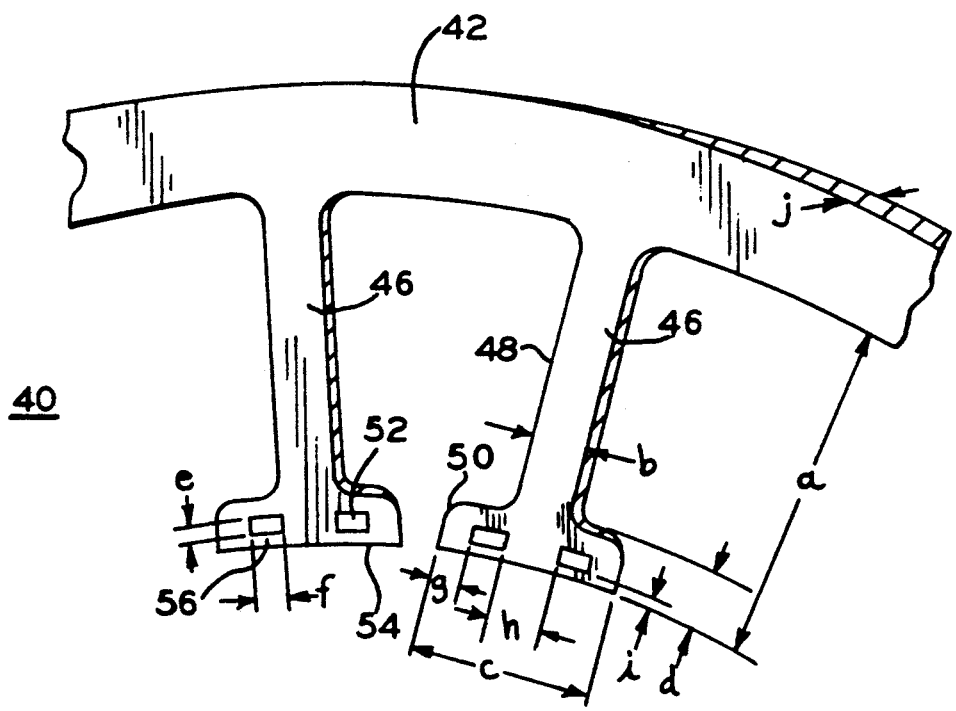
FIG_4

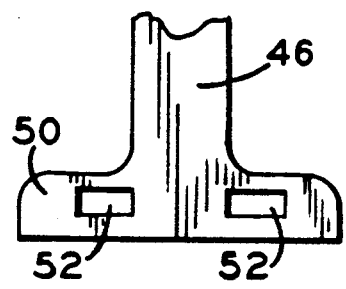
FIG_5A
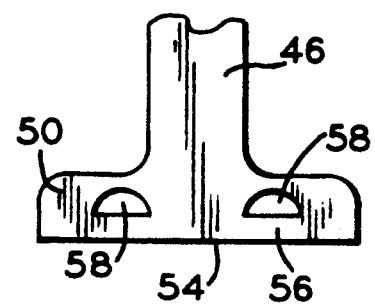
FIG_5B
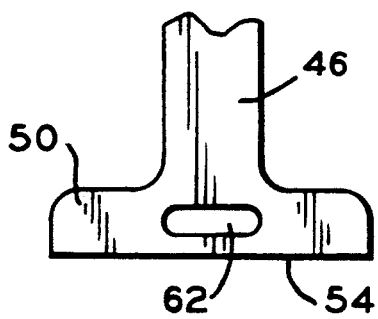
FIG_5C
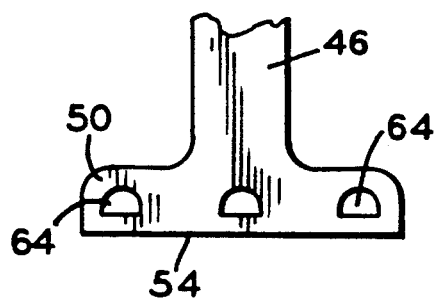
FIG_5D
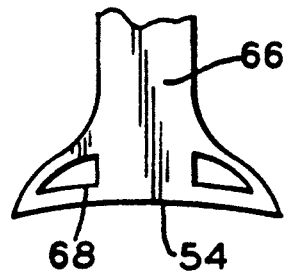
FIG_5E

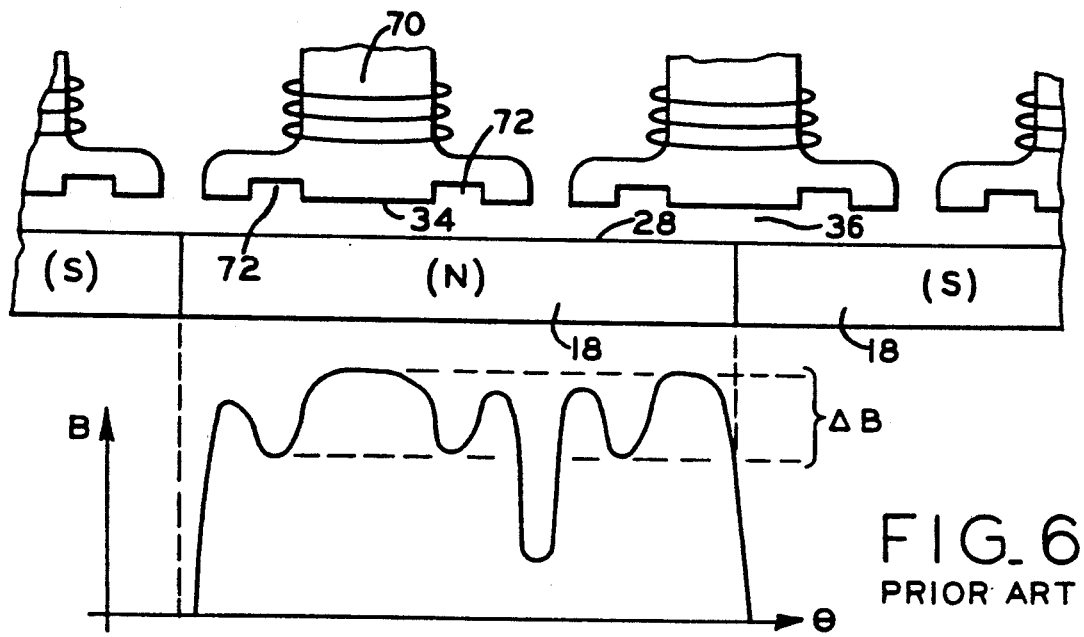
FIG_6 PRIOR ART
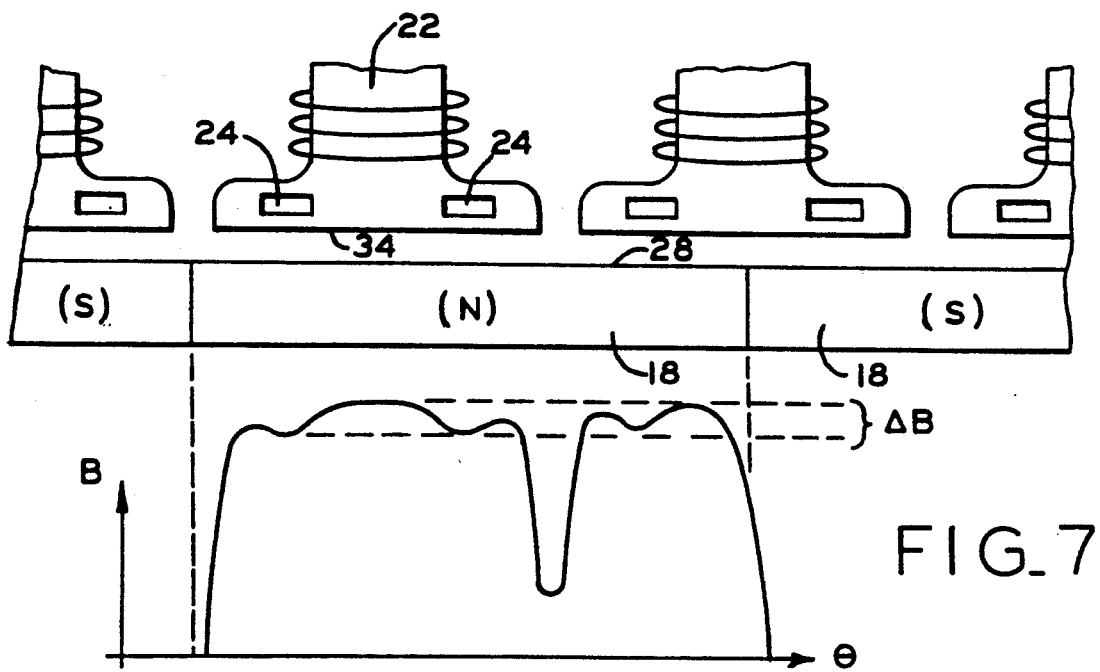
FIG_7

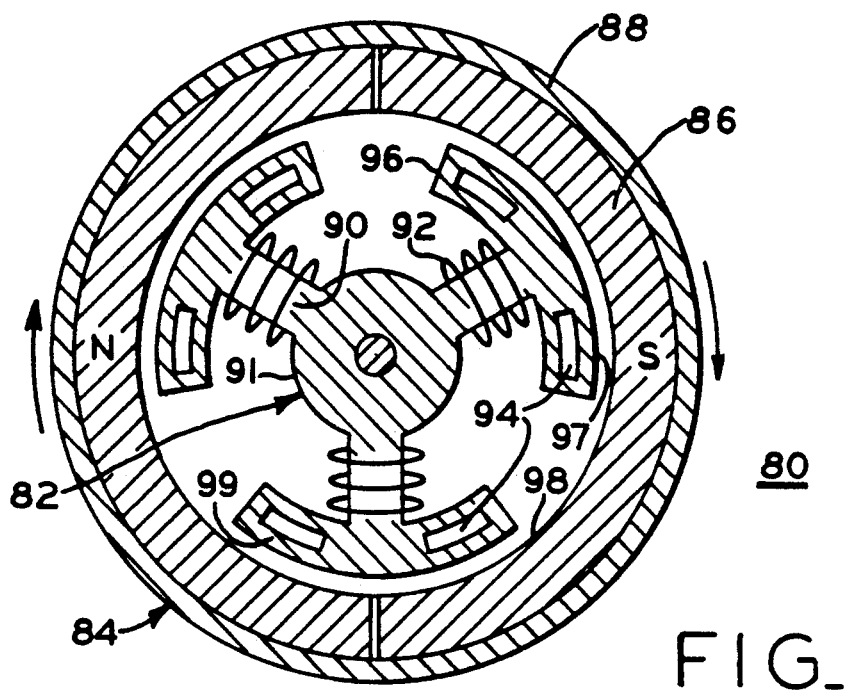
FIG_8
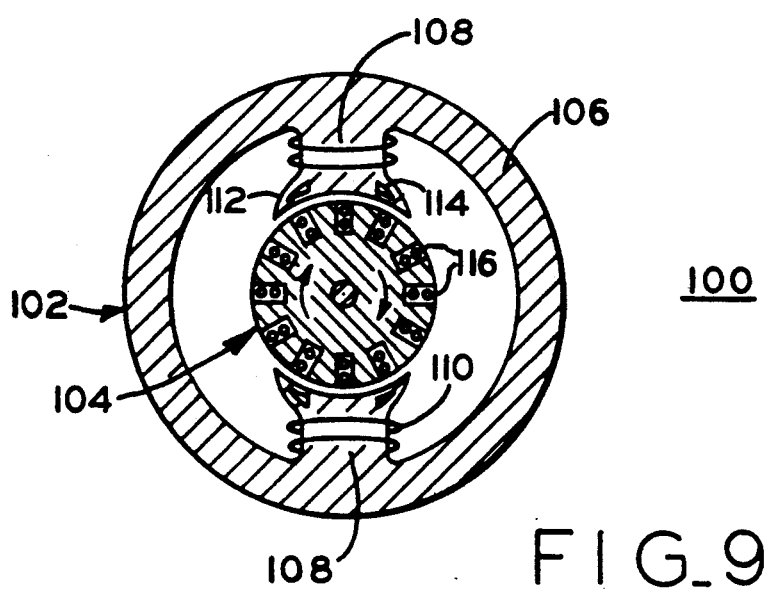
FIG_9

PERMANENT MAGNET BRUSHLESS DC MOTOR HAVING REDUCED COGGING

BACKGROUND OF THE INVENTION

The present invention generally relates to dynamoelectric machines such as motors and generators. More particularly, the present invention relates to a permanent magnet brushless DC motor having an improved stator configuration to reduce cogging. Related U.S. Pat. Nos. 4,672,253 and 4,933,584 are incorporated herein by reference.

As is well known in the art, conventional permanent magnet brush-type DC motors are typically constructed having a stator and a rotor. The stator generally includes a number of permanent magnets housed within its core to provide the magnetic field for the rotor. The armature winding of the DC motor is typically placed in slots distributed across the face of an iron laminated rotor structure, wherein the armature coils are connected to the DC supply using a conventional brush/commutator arrangement. Although brush-commutated DC motors have several advantageous characteristics, including convenience of changing operational speeds, several disadvantages are also present. These disadvantages include brush and commutator heating, erosion of commutator and brush surfaces, electrical resistance, electrical noise, and radio frequency interference caused by sparking between the brushes and the segmented commutator. These disadvantages may limit the applicability of brush-type DC motors in some fields, such as the heating, ventilation, and air conditioning (HVAC) industry.

Most of the problems associated with the brush-commutated DC motor have been solved with the development of the brushless DC motor. The brushless DC motor is basically a permanent magnet DC motor, wherein the commutator and brushes of the conventional DC motor have been replaced by electronic switches to perform the commutation. With such an electronically commutated motor (ECM), the electronic circuitry switches the motor windings at the appropriate time to control the rotation of the machine. In the permanent magnet DC brushless motor, a permanent magnet rotor is housed within a stator core having an electronically commutated winding distributed among the stator teeth. Although various sensors and feedback electronics must be used in the ECM, most of the problems associated with the mechanical brush/commutator arrangement are avoided.

However, in a brushless DC motor having salient magnetic poles, a cogging torque occurs due to the salient pole structure. As is known to those skilled in the art, "cogging" is the non-uniform rotation of the rotor caused by the tendency of the rotor to prefer certain discrete angular positions. The degree of cogging is not only affected by the number of salient poles in the stator, but also by the structural configuration of the face of the salient pole. The cogging torque may be reduced by providing a substantially constant air gap energy. Placing a notch in the face of the salient pole essentially increases the air gap at that point, in order to impose a reluctance torque, caused by the stored energy in the notches, that is equal and opposite to the cogging torque. For example, in U.S. Pat. No. 4,672,253, the problem of cogging in a permanent magnet brushless motor is addressed by adding auxiliary grooves or notches on the face of the salient poles at precise locations determined as a function of the number of salient poles, auxiliary salient poles, and winding grooves. In U.S. Pat. No. 4,933,584, the cogging of an electronically commutated motor is substantially eliminated by skewing either the magnetic field of the rotatable assembly, or by skewing the notches in the face of the salient poles in the stator.

While the use of such notches may prove beneficial to reduce cogging, it has been found that the presence of notches has a detrimental effect on the demagnetization margin, as well as on the overall performance of the dynamoelectric machine. Demagnetization of the permanent magnets occurs to some extent whenever a current flows in the motor winding. The armature becomes, in effect, an electromagnet which tends to oppose the main field magnetic flux. In brush-type permanent magnet motors, it is often necessary to provide some type of protection against demagnetization, such as the use of a soft iron pole shoe between the armature and the magnet. The high permeability of the pole shoe provides a low reluctance shunt path for the armature reaction flux around the permanent magnet, thus protecting it from being demagnetized. However, in an ECM having notches in the face of the salient pole to reduce cogging, the continuity of any magnetic flux shunt path around the permanent magnet is interrupted by the notches.

Furthermore, it has been found that the introduction of notches on the face of the salient pole also degrades the overall performance of the motor. When magnetic material is taken away to form the notch, the effect is the same as that of increasing the air gap between the face of the permanent magnet rotor and the salient pole. The presence of a larger air gap reduces the magnetic flux density, and thus affects the performance of the motor. This performance degradation can be manifested in terms of a lower efficiency or a loss of torque.

A need, therefore, exists for a permanent magnet motor having an improved stator configuration to reduce cogging, while at the same time maintaining a high efficiency and a high demagnetization margin.

SUMMARY OF THE INVENTION

A general object of the present invention is to provide an improved stator configuration for a dynamoelectric machine.

A further object of the present invention is to provide an improved permanent magnet brushless DC motor having reduced cogging.

Another object of the present invention is to provide an improved salient pole configuration for a permanent magnet motor which does not degrade either the demagnetization margin or the overall efficiency.

These and other objects are achieved by the present invention which, briefly described, is an improved salient pole configuration for a dynamoelectric machine, particularly for a permanent magnet brushless DC motor wherein cogging is a problem. According to the invention, a dynamoelectric machine comprises: a movable member having a face, the movable member having means for producing a magnetic field; and a stationary member having a core and a plurality of salient poles projecting from the core and toward the movable member, each of the plurality of salient poles having a winding at least partially disposed within the magnetic field and having a head portion having a pole face disposed substantially adjacent to the movable member face to form an air gap therebetween, at least one of the plurality of salient poles having at least one aperture disposed within the pole head portion and substantially adjacent but not adjoining the pole face. The aperture in the pole head portion creates a nonuniform reluctance path within the pole head for magnetic flux between the movable member face and the stator core to reduce cogging.

In accordance with another embodiment of the present invention, a permanent magnet brushless DC motor is comprised of a permanent magnet rotor having a central axis and an external surface; and a stator having a stator core surrounding the rotor and having a central axis coincident with the rotor central axis, the stator having a plurality of salient poles projecting inwardly from the stator core and toward the rotor, each of the plurality of salient poles having a head portion forming a pole face disposed substantially adjacent to the rotor surface, at least one of the plurality of salient poles having at least one aperture disposed within the pole head portion and substantially adjacent but not adjoining the pole face, thereby forming a bridge between the aperture and the pole face.

In accordance with still another embodiment of the present invention, a permanent magnet brushless DC motor is comprised of a stator having a stator core and having a central axis; and a permanent magnet rotor surrounding the stator and having a central axis coincident with the stator central axis, the rotor having an internal surface; the stator having a plurality of salient poles projecting outwardly from the stator core and toward the rotor, each of the plurality of salient poles having a head portion forming a pole face disposed substantially adjacent to the rotor surface, at least one of the plurality of salient poles having at least one aperture disposed within the pole head portion and substantially adjacent but not adjoining the pole face, thereby forming a bridge between the aperture and the pole face.

In accordance with a further embodiment of the present invention, a stator lamination ring comprising a substantially flat member having a thickness T, having a substantially circular empty space adapted for a rotor, and having an outer stator core portion surrounding the rotor space, the stator core portion having a plurality N of salient pole portions projecting inwardly from the stator core portion and toward the rotor space, each of the plurality of salient poles having a root portion and a pole head portion forming a pole face disposed substantially adjacent to the rotor space, the root portion having a width R, the pole head portion having a width S, wherein the width R is less than the width S, at least one of the plurality of salient pole portions having at least one aperture disposed within the pole head portion and substantially adjacent but not adjoining the pole face, thereby forming a bridge having a width U between the aperture and the pole face.

In accordance with present invention, the aperture or "reluctance hole" in the pole head portion of the stator salient pole functions to reduce cogging in the permanent magnet motor in much the same manner as the notches placed in the face of the salient pole. However, the use of a reluctance hole instead of a notch allows for the face of the salient pole head portion to remain smooth, while the reluctance hole bridge provides a low reluctance shunt path for the armature reaction flux around the permanent magnet. As a result, the demagnetization margin of the motor is significantly increased. Furthermore, improved efficiency of the motor results from the use of the reluctance hole, since the bridge provides an additional flux path across the air gap to the rotor.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

FIG. 1 is a simplified perspective view of a permanent magnet brushless DC motor shown disassembled to better illustrate the present invention;

FIG. 2 is a cross-sectional view of the DC brushless motor of FIG. 1, illustrating the use of two reluctance holes in each of the six salient poles of the stator in accordance with the present invention;

FIG. 3 is a plan view of an eighteen-salient pole stator lamination ring constructed in accordance with another embodiment of the present invention;

FIG. 4 is an enlarged partial perspective view of the stator lamination ring of FIG. 3, illustrating the size and location of the reluctance holes;

FIGS. 5A-5E are enlarged partial plan views of various embodiments of salient pole head portions;

FIG. 6 is a graphical representation of the magnetic flux density (B) distribution as a function of angular position ($\theta$) of the rotor for a brushless DC motor having notches in the face of the salient poles;

FIG. 7 is a graphical representation of the magnetic flux density (B) distribution as a function of angular position ($\theta$) of the rotor for a brushless DC motor having the reluctance hole configuration in accordance with the present invention;

FIG. 8 is a cross-sectional view of an alternative embodiment of the invention, illustrating a permanent magnet DC brushless motor having a three-salient pole stator located within a two-pole rotor; and FIG. 9 is a cross-sectional view of a DC generator having salient poles constructed in accordance with the present invention.

DETAILED DESCRIPTION OF THE INVENTION

Referring now to FIG. 1, a permanent magnet brushless direct current (DC) motor, generally designated as 10, is shown in a simplified perspective view. The DC motor includes a shaft 12, a rotating assembly or rotor 14, and a stationary assembly or stator 16. Since the preferred embodiment of the dynamoelectric machine is a one-horsepower permanent magnet brushless DC motor for HVAC applications, the shaft 12 would normally operate to power a load. However, if the dynamoelectric machine was a generator, a prime mover would rotate the shaft 12 and develop electric power in the stator 16. Although the motor 10 is shown in FIG. 1 as being disassembled for purposes of illustration, the rotor 14 and stator 16 would normally be assembled such that the central axis of the rotor, running through the center of the shaft 12, would be coincident with the central axis of the stator, such that the rotor and the stator would be in magnetic coupling relation.

The rotor 14 includes a number of permanent magnet elements 18 which rotate about the rotor's central axis of rotation. In the brushless DC motor embodiment shown in FIG. 1, four magnet elements 18 form a four-pole rotor. The magnets 18 are affixed to the external surface of the rotor 14 by gluing, embedding, or retaining them in an appropriate manner as known in the art.

The stator 16 includes a stator core 20 formed in the shape of a cylinder having a central axis coincident with the rotor central axis. The stator core 20 is typically formed from a number of individual stator rings stacked and laminated together. A number of salient poles 22 project inwardly from the stator core toward the rotor. As will be described below in more detail, each of the salient poles 22 has an upper or head portion including at least one aperture or "reluctance hole" 24 disposed therein. An armature winding 26 is disposed around the base of each of the salient poles 22 to create the magnetic field, as opposed to being distributed in the gap between the salient poles or being wound around several salient poles.

Although the embodiment of the present invention shown in FIG. 1 is a permanent magnet brushless DC motor having an armature winding on salient poles located in the stator 16, the invention is not limited to such an embodiment. As will be seen below, in an alternative embodiment of a permanent magnet DC motor, the permanent magnet rotor can be configured as an outer collar or shell which rotates about an inner stator core. Alternatively, in a DC generator, the rotor may include the armature windings, while the field windings would be disposed around the base of the salient poles in the stator. In either case, at least one aperture is disposed in the upper portion of the stator salient poles.

FIG. 2 is a cross-sectional view of the DC brushless motor of FIG. 1, illustrating a cross-section of the rotor 14 located within the stator 16. Six salient poles 22 project inwardly from the stator core 20 toward the external surface 28 of the permanent magnet rotor 14. Each of the salient poles 22 includes a root portion 30 around which the armature windings 26 are wound. The distal end of each of the salient poles 22 defines a head portion 32, the uppermost surface of which forms a pole face 34 disposed substantially parallel to and adjacent the external surface 28 of the rotor. An air gap 36 lies between the external surface 28 of the rotor and the pole face 34. In the preferred embodiment, the head portion 32 of each salient pole 22 has a width which is greater than that of the root portion 30. However, depending upon the particular application for the motor, this may not always be the case.

One or more apertures 24 are disposed within the pole head portion 32 of each of the salient poles 22 as shown. In the preferred embodiment, the apertures in the pole head portion are air-filled; however, the apertures could be filled with any material that has a magnetic permeability sufficiently lower than that of magnetic steel, and preferably close to that of air, i.e., plastic, aluminum, etc. The apertures create a nonuniform reluctance path within the pole head for magnetic flux emanating from the rotor across the air gap to the stator core. When the proper number of apertures are strategically placed within the pole heads, a reduction of cogging is achieved.

The apertures 24, or reluctance holes, are positioned substantially adjacent the pole face 34, but not adjoining it. In this manner, a portion of the pole head material remains between the edge of the reluctance hole 24 and the pole face 34 to form a bridge 38. As will be seen below, the reluctance hole bridge 38 provides a reluctance shunt path for the armature reaction flux around the permanent magnet element 18, thereby increasing the demagnetization margin of the DC motor. The bridge 38 also provides an additional flux path across the air gap 36 to the rotor 14, thereby resulting in improved efficiency, as will also be seen below.

Note that several additional advantages arise from the use of salient poles in the brushless DC motor shown in FIGS. 1 and 2. Since each of the salient poles are wound individually, as opposed to having the windings distributing between or among a number of poles, the length of the end-turns of the windings, which do not contribute to the magnetic field, are significantly reduced. Shorter end-turns not only save material, but also reduce the stator winding resistance, which, in turn, decreases the heat generated by the motor. Moreover, in using salient poles in a DC brushless motor, practically all of the windings around the base of the salient pole contributes to the magnetic field, which results in a higher efficiency.

FIG. 3 is plan view of a stator lamination ring 40 constructed in accordance with the present invention. Perhaps hundreds of these stator lamination rings 40 would be used to construct a stator core 20 for a motor. Each stator lamination ring 40 would be punched or die cut from a flat sheet of steel to have the correct salient pole and reluctance hole configuration. In the preferred embodiment, the stator lamination ring 40 is comprised of a substantially circular outer ring forming the stator core portion 42, with a substantially circular empty space 44 in the center which is adapted for the rotor 14. The outer stator core portion 42 surrounds the rotor space 44 as shown. The stator core portion 42 has a number of salient pole portions 46 projecting inwardly from the stator core portion 42 and towards the rotor space 44. In the preferred embodiment of a one-horsepower DC brushless motor for HVAC applications, eighteen salient pole portions 46 are used. The number of salient poles is generally determined by the size of the motor, i.e., only large motors would use this many salient poles.

Furthermore, in the preferred embodiment, all the stator lamination rings 40 which comprise the stator core 20 would be identical. That is, each stator lamination ring 40 would have two reluctance holes disposed in each salient pole head portion. Using this configuration, the laminated stator core would appear to have two reluctance holes bored through the head portion of each salient pole in the direction of the central axis of the stator core and extending from one end of the stator core to the other. If, however, the stator lamination ring at each end of the stator core were replaced with one having no reluctance holes, then it would not be apparent that any reluctance holes were disposed in the stator salient poles. In that case, enclosed apertures would remain within the head portion of the salient poles, and these hidden apertures would still serve the purpose of reducing the cogging torque. It is also contemplated that more than one stator lamination ring without reluctance holes could be placed at the ends of the stator, or placed between lamination rings having reluctance holes, in order to provide various aperture configurations and/or depths. As can now be seen, numerous reluctance hole configurations can be used, so long as at least one aperture is disposed within the pole head portion of at least one salient pole.

FIG. 4 is an enlarged partial perspective view of the stator lamination ring 40 of FIG. 3. In the preferred embodiment of a one-horsepower brushless DC motor for HVAC applications, each of the eighteen salient poles 46 has a root portion 48 and a pole head portion 50. In the preferred embodiment of a stator lamination ring having an overall outside diameter (dimension "x" of FIG. 4) of approximately 5.48 inches and an inner diameter "y" of approximately 4.88 inches, giving a stator core portion 42 width of approximately 0.30 inches, the height dimension (dimension "a" of FIG. 4) of each of the salient poles is approximately 0.88 inches, the width "b" of the root portion of each of the poles is approximately 0.15 inches, while the width "c" of the pole head portion 50 is approximately 0.45 inches. The height "d" of the pole head portion 50 is approximately 0.01 inches.

In the preferred embodiment, each of the eighteen salient pole portions 46 has at least one aperture or reluctance hole 52 disposed within the pole head portion 50. The reluctance hole 52 is positioned such that it is substantially adjacent the pole face 54, but not physically lying within or adjoining the pole face. Using this configuration, a bridge portion 56 remains between the reluctance hole 52 and the pole face 54. Although numerous different configurations of the reluctance hole can be used with the present invention, rectangularly-shaped reluctance holes are shown in FIG. 4. In this embodiment, the width "e" of the rectangular reluctance hole is approximately 0.04 inches, while the length "f" is approximately 0.09 inches. As also shown in FIG. 4, this leaves approximately 0.08 inches ("g") of the head portion remaining on the outer sides of the reluctance hole, and approximately 0.10 inches ("h") between the two reluctance holes. The bridge portion 56 has a width "i" of approximately 0.02 inches. The thickness "j" of each of the stator lamination rings is approximately 0.03 inches.

The number of reluctance holes disposed in each salient pole depends upon the total number of stator salient poles and rotor magnetic poles. In a permanent magnet DC brushless motor having a stator core comprised of a number of the stator lamination rings 40 of FIG. 3, two reluctance holes 52 per salient pole 46 would be used to achieve magnetic symmetry to reduce cogging. More specifically, if the ratio of the number of stator salient poles to the number of rotor magnetic poles remains 1.5, then two reluctance holes per salient pole would be used. For example, as shown in FIG. 3, eighteen salient poles would be used with a rotor having twelve magnetic poles, such that the ratio 18/12=1.5. Similarly, in FIG. 2, the ratio of six stator salient poles to four rotor magnetic poles is also 1.5, such that two reluctance holes are again used. As will be seen below, a different number of reluctance holes and/or salient pole configurations can be used.

FIGS. 5A-5E are enlarged partial plan views of various embodiments of the salient pole head portions 50 showing numerous configurations for the size, shape, and location of the reluctance holes. In FIG. 5A, two reluctance holes 52 exhibit a rectangular shape having the dimensions described in conjunction with FIG. 4.

In FIG. 5B, the reluctance holes 58 have been changed to exhibit a semicircular or "D-shape", wherein the bottom of the reluctance hole which lies parallel to the face 54 of the pole head portion is flattened as shown. This configuration allows for the maximum amount of material to be removed from the pole head portion for purposes of cogging reduction, while at the same time maintains a sufficiently-wide bridge portion 56 for purpose of improving the demagnetization margin.

FIG. 5C illustrates the head portion 50 of a salient pole 46 having a single reluctance hole 62 disposed therein. The reluctance hole 62, in this embodiment, has an oblong shape which is elongated in the direction parallel to the pole face 54 as shown. One reluctance hole, such as shown here, could be used in a DC brushless motor having twelve salient poles and ten rotor magnetic poles.

FIG. 5D illustrates that three reluctance holes 64 could also be used, preferably, for a DC brushless motor having a very high number of rotor magnetic poles. The exact location of the holes 64 would be determined by the location of the rotor magnetic poles with respect to the gap between the pole head portions.

Finally, in FIG. 5E, the shape of the salient pole 66 may prescribe the shape of the reluctance holes 68. In this embodiment, the reluctance holes are substantially triangular having a bottom edge parallel to the pole face 54.

It is also contemplated that, depending upon the amount of cogging reduction desired for the particular application, one or more reluctance holes could be disposed in only certain salient poles, such as, for example, alternating salient poles, or only the salient poles of the inside lamination rings. The number of reluctance holes could also vary depending upon whether or not the stator core includes one or more auxiliary poles or "inter-poles" disposed in the gap between the salient poles. The inter-poles themselves may also exhibit the reluctance hole configuration of the present invention.

FIG. 6 is a graphical representation of the air gap magnetic flux density (B) distribution as a function of angular position ($\theta$) of the rotor for a brushless DC motor having notches in the face of the salient poles. A number of salient poles 70 are shown at the top of the figure, wherein each of the pole head portions contains two notches 7 which extend from the pole face 34 into the pole head. An air gap 36 lies between the pole face 34 and the external surface 28 of the rotor, which is only partially shown as having a number of permanent magnets 18.

The air gap flux density distribution $B(\theta)$ is shown for one of the rotor magnetic pole segments (north) as a function of the angular position ($\theta$) of the rotor. As can be seen from the graph, the flux density B is highest at the center of the salient pole, and lowest at the gap between the pole head portions. The flux density B also drops significantly at the position of each of the notches 72. The change in flux density $\Delta B$ over the pole face can be seen to exhibit a highly irregular ripple having an average flux density which is much lower than that which would normally be exhibited by a motor having salient poles without the notches 72. Although the presence of the notches 72 would improve the cogging performance, a brushless DC motor having such a flux density distribution would typically exhibit an efficiency of approximately 78%. Moreover, the demagnetization margin would be significantly degraded.

FIG. 7 is a graphical representation of the magnetic flux density distribution $B(\theta)$ for a brushless DC motor having the reluctance hole configuration in accordance with the present invention. In this figure, two reluctance holes 24 are disposed in the head portion of each of the salient poles 22 in the manner shown in FIG. 2. Note that the maximum flu density distribution again lies at the center of the salient pole 22, while the minimum lies in the gap between adjacent salient pole head portions. However, note that the flux density distribution at the reluctance holes 24 is significantly higher than that of the flux density distribution at the notches shown in FIG. 6. FIG. 7 illustrates that the change in flux density distribution ΔB over each pole face is significantly reduced from that of FIG. 6, such that the flux density distribution across the air gap is much less irregular. Moreover, note that the average flux density distribution is much higher when reluctance holes are used as opposed to notches in the pole face. Hence, the reluctance holes exhibit less losses, which results in improved efficiencies.

FIG. 8 is a cross-sectional view of still another embodiment of the present invention, illustrating a permanent magnet DC brushless motor 80 having a three-salient pole stator 82 located within a two-pole rotor 84. The configuration of FIG. 8 is basically the "inside-out" version of the brushless DC motor shown in FIG. 2 with different numbers of poles. In FIG. 8, the permanent magnet rotor 84, having two permanent magnets 86 affixed to the inside surface of an outer collar or shell 88, rotates on bearings (not shown) around the central axis of the stator 82. The stator itself is comprised of three salient poles 90 projecting outwardly from a stator core 91 and having armature windings 92 surrounding the root portion of the salient poles, and having reluctance holes 94 disposed in the head portion 96 of each of the salient poles. In the DC brushless motor of FIG. 8, the reluctance holes perform the same function of reducing cogging torque while at the same time maintaining an adequate demagnetization margin.

Note that the ratio of stator salient poles 90 to rotor magnetic poles 86 remains at 1.5, such that two reluctance holes 94 are used. In this configuration, the stator 84 has a number of salient poles 90 projecting outwardly from the stator core 91 and toward the rotor 84. Each of the salient poles 90 has a head portion 96 which forms a pole face 97 disposed substantially adjacent to the internal surface 98 of the rotor 84. The reluctance holes 94 are disposed in the pole head portion substantially adjacent but not adjoining the pole face 97, thereby forming a bridge 99 between each reluctance hole 94 and the pole face 97.

FIG. 9 is a cross-sectional view of a DC generator 100 having stator salient poles constructed in accordance with the present invention. The generator 100 is comprised of a stator 102 and a rotor 104, wherein the stator 102 includes a stator core 106, two stator salient poles 108, and a number of salient pole exciting windings 110. In accordance with the present invention, the head portion 112 of each of the salient poles 108 includes one or more reluctance holes 114 disposed therein and substantially adjacent but not adjoining the pole face. The rotor 104 itself includes a number of armature windings 116 distributed within slots in the face of the rotor. These armature windings would be connected to a commutator (not shown) as known in the DC generator art. The addition of the reluctance holes in the salient poles of a DC generator can provide the same advantages as explained above for a DC brushless motor.

In review, it can now be seen that the present invention provides an improved stator configuration for a dynamoelectric machine, particularly for a permanent magnet brushless DC motor having salient poles, wherein cogging and demagnetization problems must be addressed. The presence of an aperture or a reluctance hole in the pole head portion of the salient pole serves to reduce cogging in the permanent magnet motor in much the same manner as notches placed in the face of the salient pole, while avoiding the demagnetization and efficiency problems associated with such notches. The use of a reluctance hole instead of a notch provides a bridge portion to shunt the armature reaction flux around the permanent magnet to improve the demagnetization margin. The efficiency of the dynamoelectric machine is also improved, since the bridge provides an additional flux path across the air gap. As a result, the performance of the brushless DC motor is significantly improved, particularly for one-half to one-horsepower motors used for HVAC applications.

While only particular embodiments of the invention have been shown and described herein, it will be obvious that further modifications and improvements may be made by those skill in the art. For example, the reluctance hole configuration of the present invention may be used with any type of dynamoelectric machine, such as, for example, DC motors, generators, etc. Furthermore, the particular salient pole configurations and reluctance hole dimensions of the preferred embodiment could readily be modified for different machines and/or different applications. Accordingly, the appended claims are intended to cover all such modifications and alternative constructions that fall within the true scope and spirit of the invention.

What is claimed is:

1. A dynamoelectric machine comprising:
   a movable member having a face and a direction of movement, said movable member further having means for producing a predefined number of magnetic poles; and
   a stationary member having a core and having a predefined number of salient poles projecting from said core and toward said movable member, the number of salient poles of said stationary member being greater than the number of magnetic poles of said movable member, each of said salient poles having a winding and having a pole head portion forming a pole face disposed substantially adjacent to said movably member face to form an air gap therebetween, at least one of said salient poles having aperture means, including at least one aperture symmetrically disposed within said pole head portion and substantially adjacent but not adjoining said pole face, for creating a nonuniform reluctance path within said pole head portion for magnetic flux emanating from said movable member face across said air gap to said stationary member core, and for reducing the cogging torque normally present in a dynamoelectric machine having a salient pole configuration.

2. The dynamoelectric machine according to claim 1, wherein said dynamoelectric machine is a DC motor.

3. The dynamoelectric machine according to claim 1, wherein said dynamoelectric machine is a permanent magnet brushless DC motor.

4. The dynamoelectric machine according to claim 1, wherein said dynamoelectric machine is a DC generator.

5. The dynamoelectric machine according to claim 1, wherein said dynamoelectric machine is a DC motor having a rating of at least one-half horsepower.

6. The dynamoelectric machine according to claim 1, wherein said moveable member is a permanent magnet rotor.

7. The dynamoelectric machine according to claim 1, wherein said stationary member includes a stator core having has at least six salient poles.

8. The dynamoelectric machine according to claim 7, wherein each of said salient poles includes at least two apertures symmetrically disposed within the pole head portion thereof.

9. The dynamoelectric machine according to claim 1, wherein the ratio of the number of salient poles of said stationary member to the number of magnetic poles of said movable member is 1.5, and wherein exactly two apertures are symmetrically disposed within the pole head portion of each salient pole.

10. The dynamoelectric machine according to claim 1, wherein said stationary member is comprised of a plurality of stator lamination rings each having at least one aperture disposed symmetrically within a pole head portion.

11. The dynamoelectric machine according to claim 1, wherein the cross-section of said aperture, taken perpendicular to the direction of movement of said moveable member, is rectangularly-shaped.

12. The dynamoelectric machine according to claim 1, wherein the cross-section of said aperture, taken perpendicular to the direction of movement of said moveable member, is substantially D-shaped.

13. The dynamoelectric machine according to claim 1, wherein the cross-section of said aperture, taken perpendicular to the direction of movement of said moveable member, is substantially oblong-shaped.

14. The dynamoelectric machine according to claim 1, wherein said head portion of a salient pole is substantially wider than the remainder of the salient pole.

15. The dynamoelectric machine according to claim 1, wherein a uniform reluctance path exists across said pole face in the direction of movement of said moveable member.

16. A permanent magnet brushless DC motor comprising:
a permanent magnet rotor having a predefined number of magnetic poles, a central axis, and an external surface; and
a stator having a stator core surrounding said rotor and having a central axis coincident with said rotor central axis, said stator having a plurality of salient poles projecting inwardly from said stator core and toward said rotor, the number of stator salient poles being greater than the number of rotor magnetic poles, each of said plurality of salient poles having a root portion including a winding, and having a head portion forming a pole face disposed substantially adjacent to said rotor external surface, said head portion being wider than said root portion, at least one of said plurality of salient poles having aperture means, including a plurality of apertures symmetrically disposed within said pole head portion and substantially adjacent but not adjoining said pole face, for forming a bridge between said aperture means and said pole face, and for reducing the cogging of said motor.

17. The permanent magnet brushless DC motor according to clam 16, wherein said motor has a rating of at least one-half horsepower.

18. The permanent magnet brushless DC motor according to claim 16, wherein the ratio of the number of stator salient poles to the number of rotor magnetic poles is 1.5, and wherein two apertures are disposed within the pole head portion of each salient pole.

19. The permanent magnet brushless DC motor according to claim 16, wherein the cross-section of each of said apertures, taken perpendicular to said stator central axis, is substantially elongated along an axis which is substantially parallel to said pole face.

20. The permanent magnet brushless DC motor according to claim 16, wherein the number of salient poles is greater than 12, and wherein the number of rotor magnetic poles is greater than 9.

21. A permanent magnet brushless DC motor comprising:
a stator having a stator core and having a central axis; and
a permanent magnet rotor surrounding said stator and having a central axis coincident with said stator central axis, said rotor having an internal surface and having a predefined number of magnetic poles;
said stator having a plurality of salient poles projecting outwardly from said stator core and toward said rotor, the number of stator salient poles being greater than the number of rotor magnetic poles, each of said plurality of salient poles having a root portion including a winding, and having a head portion forming a pole face disposed substantially adjacent to said rotor internal surface, said head portion being wider than said root portion, at least one of said plurality of salient poles having aperture means, including a plurality of apertures symmetrically disposed within said pole head portion and substantially adjacent but not adjoining said pole face, for forming a bridge between said aperture means and said pole face, and for reducing the cogging of said motor.

22. The permanent magnet brushless DC motor according to claim 21, wherein said motor has a rating of at least one-half horsepower.

23. The permanent magnet brushless DC motor according to claim 21, wherein the ratio of the number of stator salient poles to the number of rotor magnetic poles is 1.5, and wherein two apertures are disposed within the pole head portion of each salient pole.

24. The permanent magnet brushless DC motor according to claim 21, wherein the cross-section of each of said apertures, taken perpendicularly to said stator central axis, is substantially elongated along an axis which is substantially parallel to said pole face.

* * * * *